United States Patent Office 2,917,365
Patented Dec. 15, 1959

2,917,365
PRODUCTION OF CATALYST SUPPORTS

George R. Gilbert, Elizabeth, N.J., assignor to Esso Research and Engineering Company, a corporation of Delaware No Drawing. Application April 1, 1955
Serial No. 498,775

7 Claims. (Cl. 23—143)

This invention pertains to the production of catalyst supports and particularly to the production of alumina. More specifically, this invention relates to an improved method for forming beta alumina trihydrate from aluminum alcoholate.

It has been known for some time that catalysts that are especially useful for hydrotreating hydrocarbon fractions can be prepared by depositing the active catalytic component such as molybdenum oxide, chromium oxide, or the like, as well as platinum group metals, particularly platinum itself, upon a support or base consisting essentially of aluminum oxide. Previous experience with hydroforming catalysts has shown that the catalyst base or support exerts a strong influence upon the ultimate behavior or activity of the catalyst and that the method of preparing the base or support also has a very important bearing upon the ultimate properties of the catalyst.

It has recently been found that catalysts of outstanding activity and selectivity for hydroforming reactions are produced when platinum is deposited upon a high purity alumina which is in the eta phase. The eta alumina, of the desirable or necessary high purity, can be prepared by careful calcination of beta alumina trihydrate of high purity. Beta alumina trihydrate can be prepared in 100% purity from aluminum alcoholate, for example, by hydrolyzing the aluminum alcoholate in water at room temperature and allowing the resultant slurry to age at room tempearture for upwards of about 40 hours. The aging time necessary to effect complete conversion of the hydrous alumina to beta alumina trihydrate can be shortened somewhat by hydrolyzing the alcoholate with aqueous ammonia solutions. The aged slurry may then be oven dried at about 210°–260° F. and the beta alumina trihydrate may then be converted to pure eta alumina by heating or calcining at about 900°–1300° F. for periods of from about one to six hours. The eta alumina prepared in the manner described is an excellent base or support for platinum for use as the catalyst in the hydroforming of motor gasoline or naphtha fractions, since both catalyst activity and maintenance of activity are extremely good, as is the selectivity to gasoline product. A disadvantage of previous methods of preparing pure alumina of high eta content has been the fact that the preparation is somewhat tedious and time-consuming.

The object of this invention is to prepare eta alumina from aluminum alcoholate in a simple, expeditious manner.

It is also the object of this invention to prepare eta alumina in high degree of purity from aluminum alcoholate without the use of additional chemicals, low temperatures, and/or excessively long aging periods.

These and other objects will appear more clearly from the detailed specification and claims which follow.

It has now been found that beta alumina trihydrate can be prepared in very pure form in less than about 30 minutes by hydrolyzing aluminum alcoholate with water containing a relatively small amount of beta alumina trihydrate dispersed or suspended therein. In a preferred embodiment, beta alumina trihydrate which was dried at 250° F. is dispersed in substantially more than the minimum amount of water necessary for the formation of the beta alumina trihydrate, whereupon the aluminum alcoholate is added to the aqueous slurry or suspension of beta alumina hydrate. The resultant mixture is stirred for about 30 minutes, filtered to produce a gel-like cake, washed, and dried. While it is not desired to be limited to a specific theory, it would appear that the beta alumina trihydrate particles suspended in the hydrolyzing medium act as "seeds" which serve to accelerate the conversion of the hydrous alumina formed on hydrolysis of the aluminum alcoholate quickly and completely to beta alumina trihydrate, which may then be calcined to form substantially 100% eta alumina. The beta alumina trihydrate seeds also serve to facilitate the separation of the alcohol-hydrocarbon diluent phase from the aqueous phase on hydrolysis. The eta alumina may then be mixed with other catalyst components, particularly hydrogenation-dehydrogenation components such as platinum, to form hydroforming catalysts of outstanding activity and selectivity characteristics.

Metallic aluminum is first reacted with an alcohol to form aluminum alcoholate. The metallic aluminum, which may be in the form of chips, shot, turnings, ingots, or the like, is reacted with the alcohol, preferably in the presence of a hydrocarbon diluent and in the presence of a suitable catalyst such as mercuric chloride or other mercury salts, iodine, aluminum halides, or the like. The formation of the alcoholate takes place in accordance with the following equation:

Equation I

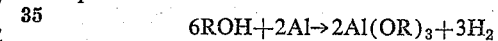

$$6ROH + 2Al \rightarrow 2Al(OR)_3 + 3H_2$$

The hydrogen is in the gaseous state and escapes from the reaction mixture.

For the present process the alcohol must be essentially anhydrous. Alcohols that can be used in this process include ethanol, propanol, isopropanol, n-butyl alcohol, secondary butyl alcohol, isobutyl alcohol, pentanol-1, pentanol-2, 3-methyl butanol-1, 2-methyl butanol-3, pentanol-3, hexanol-1, hexanol-2, hexanol-3, the various methyl pentanols, the various dimethyl butanols, the various heptyl alcohols, the various octyl alcohols, etc., including those higher alcohols liquid at the temperature of operation of the process. Instead of using any one of the alcohols singly, mixed alcohols such as mixed amyl alcohols may be used. Mixtures of alcohols of different molecular weights can also be used.

Other compounds, such as the phenols, can be used in this process.

In general, it is preferred to utilize water-immiscible alcohols, i.e., those containing 5 or more atoms of carbon per molecule, since this facilitates the recovery of the alcohol in anhydrous form for reuse in the preparation of aluminum alcoholate. In order to further facilitate the separation of the alcohol from the water when using a water-insoluble alcohol, a hydrocarbon, such as a petroleum distillate boiling within the range of 200°–500° F. or higher, preferably of narrow boiling range which includes the boiling range of the alcohol used, may be added to the alcohol. Instead of using a hydrocarbon fraction, selected hydrocarbons such as heptane, octane, toluene, xylene, etc., may be used. Although such addition of the hydrocarbon is not essential to the process, the use of the hydrocarbon diluent has the following advantages:

(1) The diluent aids in controlling the reaction of the alcohol and aluminum metal since a large amount of heat is liberated in the reaction and the hydrocarbon diluent aids in the dissipation of this heat;

(2) The hydrocarbon serves as a solvent for the solid aluminum alcoholate; and (3) The hydrocarbon diluent greatly aids in the separation and recovery of the alcohol from the slurry after hydrolysis.

The aluminum alcoholate is then hydrolyzed with good agitation and with a large excess of water, i.e., 1 to 10 times the volume of alcoholate, to which some previously formed beta alumina trihydrate has been added. The beta alumina trihydrate added to the water for hydrolysis may be previously dried at conventional temperatures of about 250° F., or it may be in the form of undried filter cake. Instead of adding beta alumina trihydrate to water to form the hydrolysis medium, water previously used for hydrolysis and containing beta alumina trihydrate dispersed or suspended therein may be used to hydrolyze the aluminum alcoholate or it may be added to fresh water to form the hydrolyzing medium.

The concentration of beta alumina trihydrate in the hydrolyzing medium may range from about 0.1 to 1.0% or higher, but the preferred concentration is about 0.2% by weight. The temperature during hydrolysis may range from about 40° F. to 210° F., but the preferred range is from 60° F. to 90° F. If desired, small amounts of ammonia may be added to the hydrolyzing medium. The concentration of $NH_3$ in the medium may be in the range of about 1.8 to 3.4 weight percent.

The aluminum alcoholate solution is added slowly to the slurry of beta alumina trihydrate in water (e.g., 4 liters of alcoholate per hour to 8 liters of slurry with agitation). However, as the temperature of hydrolysis is decreased, the rate of addition can be increased within the foregoing limits. The alcoholate is normally added to the water.

When using water-insoluble alcohols, the alcohol which is reformed or regenerated by the hydrolysis step together with the hydrocarbon diluent forms a layer separate and distinct from the slurry of hydrous alumina and is easily recovered and removed by a simple process of decanting or the like. In the absence of the beta alumina trihydrate "seeds" an appreciable amount of time is required for the alcohol-hydrocarbon mixture to "spring" out of the hydrolysis mixture.

When using a water-soluble alcohol for reacting with aluminum to form the alcoholate, the alcohol reformed upon hydrolysis of the alcoholate goes into solution in the water and can be recovered by distillation. The recovered alcohol must then be dehydrated to anhydrous form in known manner before it is again used for reaction with additional metallic aluminum.

The alumina slurry thus formed and in which the alumina is in the beta trihydrate form is then preferably first filtered and then dried at a temperature in the range of 200°–250° F. to remove the aqueous suspending medium. Eta alumina is formed by further dehydrating the beta alumina trihydrate (bayerite) generally in the presence of air. It has been found that this conversion is essentially quantitative when the activating or calcining temperature is in the range of 400°–1250° F., preferably 450°–1100° F. Because of the aforementioned transformation of beta trihydrate to eta alumina, the eta content of the activated alumina can also be used to indicate the amount of beta alumina trihydrate formed by the hydrolysis.

This calcination or activation treatment can alternatively follow the addition of the catalyst component where the combined catalyst is heated in the same temperature range. This is explained in further detail below. In a similar manner the dehydrogenation or active catalytic component can be added to the base either before or after the latter is dried.

The eta alumina can be converted into a hydroforming catalyst by the addition of molybdenum oxide, vanadium oxide, tungsten oxide, or chromium oxide, or metallic salts of molybdic acid such as calcium molybdate or cobalt molybdate, or mixtures of cobalt oxide and molybdenum oxide, or preferably precious metals such as platinum or palladium. The incorporation of the catalytic component can be effected in any of a variety of ways well known to the art. For example, molybdenum oxide can be incorporated by slurrying molybdenum oxide with the hydrous alumina or the latter may be dried and the molybdenum oxide sublimed thereon. Alternatively the molybdenum oxide may be incorporated by treating the alumina with ammonium molybdate.

The amount of catalytic component added can be varied, depending to a large degree upon the particular material used. For the most part the catalytic metal oxides or metallic salts of molybdic acid are applied in sufficient amount to give from about 5 to 20 weight percent of the said component in the final composite, although in the case of chromium oxide as much as 40 weight percent may be incorporated. In the case of the precious metal catalysts about 0.001 to 2.0 weight percent of platinum or about 0.5 to 5.0 weight percent of palladium will suffice to give a catalyst of the desired activity. The dehydrogenating or active catalytic component can be added to the base either before or after the latter is dried, as explained before. It is ordinarily preferred to subject the catalyst to a calcination treatment or heating to temperatures of up to about 1200° F. prior to use in a reforming or hydroforming process.

Because of the marked superiority of eta alumina as a support for platinum catalysts, more detailed information is supplied on the preparation of these materials.

The platinum is impregnated on the alumina support by means known in the art. One of the better means involves treatment of the alumina support with aqueous solutions of water-soluble inorganic platinum-containing compounds. The term "water-soluble" also includes platinum-containing compounds which form colloidal solutions. Typical of the water-soluble inorganic platinum-containing compounds are chloroplatinic acid, potassium platinum chloride, platinum disulphide, tetramino platino chloride, potassium platino-nitrite, dichloro diamino platinum, ammonium platino-nitrite, and dinitrito-diamino-platinum. A conveniently used aqueous platinum solution is one containing 15 grams of $H_2PtCl_6 \cdot xH_2O$ (40% Pt) per liter. This strength can be employed to yield catalysts containing about 0.5% platinum; lower or higher concentrations are employed when it is desired to alter the platinum content of the final catalyst. The gross amount of solution utilized is preferably that required to impregnate with the desired amount of platinum by just wetting the total alumina. The alumina support in the platinum solution is heated to dryness, conveniently at temperatures of about 100°–600° F. at atmospheric pressure, which results in removal of a substantial portion of the water.

The final step in the preparation involves the subjection of the dried catalyst to a reduction step. This reducing step can be carried out by means known in the art, such as hydrogenation and treatment with chemical reducing agents. Typical of these reduction operations is treatment with hydrogen at 200°–1000° F. with hydrogenation pressures of atmospheric to 1000 pounds p.s.i.g. The catalyst may be calcined after the drying step. Calcining can be carried out at temperatures of the order of about 1100° F., e.g., 800°–1250° F. Both types of operations are preferably carried out slowly, for example, over the course of about 4 to 24 hours.

It has also been found desirable to treat the catalyst, either before, after, or during impregnation of the active catalytic component, with an aqueous dilute combined acid solution, i.e., an oxidizing acid such as $HNO_3$, perchloric acid, or hypochlorous acid, together with a hydrogen halide such as HCl, HF, HI, and HBr. $HNO_3$ and HCl are preferred. It has been found that 0.1 to 8 weight percent nitric acid based on the total catalyst and 50–500 weight percent water is suitable. It is preferred to employ a dilute solution which is about 0.01 molal to 2.5 molal $HNO_3$.

The HCl is employed in an amount of about 1 to 30 weight percent based on the catalyst. This acid is contained in from 50 to 500 weight percent water based on the supported catalyst. These concentrations of acid do not dissolve the support appreciably. It is preferred to use solutions which are from 0.1 molal to about 3 molal HCl.

In acid treating, the calcined catalyst is contacted with the acid, then the acid is drained off and the catalyst is washed thoroughly with distilled water, and then it is dried at 250° F. and recalcined for 1 to 4 hours at 1100° F. in the case of Pt catalysts.

It is also advantageous to treat the fresh catalyst with gaseous halogen, e.g., chlorine, in an amount of from 0.1 to 10 weight percent on catalyst and preferably 1 to 3 weight percent.

Catalysts prepared as described above are useful in the conversion of hydrocarbons, particularly in the hydroforming of naphtha or motor fuel boiling range fractions.

The operating conditions of the hydroforming operation are pressures in the range of 50 to 1000 p.s.i.g., usually 100 to 700 p.s.i.g., and temperatures in the range of 700°–1100° F., usually 875°–950° F. The hydrogen dilution may vary from about 1000 to 10,000 cubic feet per barrel of liquid feed.

The feed or charging stock to the hydroforming reactor can be a virgin naphtha, a thermally- or catalytically-cracked naphtha, a Fischer-Tropsch naphtha, mixtures of these, or the like. The feed stock is preheated alone or in admixture with recycle gas to reaction temperature or to the maximum temperature possible while avoiding thermal degradation of the feed stock.

A particularly useful catalyst for these operations has been found to be platinum supported on an alumina base. For instance, a commonly used composition of such catalyst is one containing from 0.001 to 2.0 weight percent platinum, the remainder being the alumina spacing agent or base.

This invention will be better understood by reference to the following examples.

*Example I*

100 cc. of aluminum alcoholate solution containing about 100 grams of $Al_2O_3$ as aluminum amylates per liter were mixed into 500 cc. of distilled water at room temperature. The solvent for the aluminum amylates was composed of about 50 volume percent of amyl alcohols and about 50 volume percent of hydrocarbons. The mixture was stirred for 30 minutes, filtered, with suction, through a Büchner funnel. The filter cake was washed on the funnel with 200 cc. of distilled water. A gel-like cake was produced. The washed filter cake was dried at 250° F. for about sixteen hours. Upon X-ray diffraction analysis the beta alumina trihydrate content was found to be about 45%, the remainder being of the alpha form.

In an experiment designed to show the benefits of the present invention, one gram of powdered beta alumina trihydrate (previously made by aging an aluminum hydroxide gel for five days and drying at 250° F.) was slurried in 500 cc. of water. 100 cc. of the same aluminum alcoholate solution as used above were mixed into the slurry of beta alumina hydrate in water. The mixture was stirred for thirty minutes, filtered, washed, and dried as described above. The filter cake was chalky white in color. Upon X-ray analysis it was found that the material was 100% beta alumina trihydrate.

A further experiment as per the preceding paragraph was tried in which only 50 cc. of water (containing added beta alumina trihydrate) was used for the hydrolysis. Even after aging overnight, the dried precipitate contained only 88% beta alumina trihydrate, showing the necessity of using relatively large amounts of water.

*Example II*

In this experiment, no "seeding" material was used. Twenty gallons of aluminum alcoholate solution (similar to that used in the previous example) were jetted into 40 gallons of water containing 3 weight percent of $NH_3$ at a temperature of about 60° F. The alcoholate was added over a period of about 60 minutes. It took about 9 hours for the alcohol-hydrocarbon layer to "spring" out completely. After separating the alcohol-hydrocarbon layer, about 40 gallons of aqueous layer containing a slurry of aluminum hydroxide were recovered. The alumina obtained from the slurry was essentially 100% beta alumina trihydrate.

Three gallons of the slurry prepared as in the foregoing paragraph were diluted with water, containing 3 weight percent $NH_3$, so that a 40-gallon quantity of solution was obtained containing about 0.4 weight percent alumina as "seeds." Twenty gallons of aluminum alcoholate solution was jetted into this hydrolyzing solution as described above. The alcohol-hydrocarbon layer "sprang" out completely in only one hour, so that a saving of eight hours' settling time was saved thereby. The alumina obtained from this example was essentially 100% beta alumina trihydrate.

*Example III*

A 5-gram portion of powdered beta alumina trihydrate is slurried in 500 cc. of water and 100 cc. of aluminum alcoholate solution is added while stirring. Upon filtering and drying at 250° F., the material was found to be 100% beta alumina trihydrate. This experiment shows that as much as 1 weight percent of beta alumina trihydrate in the hydrolysis medium is beneficial.

*Example IV*

A similar experiment to that shown in Example III above was made, except that only 0.25 gram of beta alumina trihydrate is slurried in 500 cc. of water. The material obtained in this experiment was found to be 100% beta alumina trihydrate.

The foregoing description contains a limited number of embodiments of the present invention. It will be understood, however, that numerous variations are possible without departing from the scope of this invention.

What is claimed is:

1. The method of preparing alumina especially adapted for use as a catalyst support and consisting substantially completely of eta alumina, which comprises the steps of hydrolyzing an aluminum alcoholate solution in water containing about 0.1 to 1.0 weight percent of beta alumina trihydrate, at temperatures of from 40° F. to 200° F., the amount of water being in the range of 1 to 10 volumes per volume of alcoholate solution, agitating the resultant mixture for about 30 minutes, without substantial aging separating the beta alumina trihydrate slurry formed, drying and heating the alumina to a temperature in the range of 250°–1250° F. to further dehydrate it.

2. The process as defined in claim 1 in which the aluminum alcoholate is derived from an alcohol containing at least five carbon atoms per molecule.

3. The process as defined in claim 1 in which the beta alumina trihydrate is predried at about 250° F. prior to slurrying the same with the water used for hydrolysis of the aluminum alcoholate.

4. The process as defined in claim 1 in which the water containing beta alumina trihydrate used for hydrolysis of the aluminum alcoholate is made up in part by an aqueous slurry of alumina hydrate derived from a previous "seeded" hydrolysis of an aluminum alcoholate.

5. The process as defined in claim 4 in which an additional quantity of beta alumina trihydrate is added to the aqueous slurry used for hydrolysis of the aluminum alcoholate.

6. The process as defined in claim 5 in which the beta alumina trihydrate is predried at about 250° F. prior to addition to the aqueous slurry.

7. The process as defined in claim 6 in which the aluminum alcoholate is derived from an alcohol containing at least five carbon atoms per molecule.

References Cited in the file of this patent

UNITED STATES PATENTS

| | | |
|---|---|---|
| 2,579,251 | Coates et al. | Dec. 18, 1951 |
| 2,636,865 | Kimberlin | Apr. 28, 1953 |
| 2,657,978 | Johnson | Nov. 3, 1953 |
| 2,707,669 | Houston et al. | May 3, 1955 |
| 2,796,326 | Kimberlin et al. | June 18, 1957 |

FOREIGN PATENTS

| | | |
|---|---|---|
| 667,145 | Great Britain | Feb. 27, 1952 |